United States Patent
Yanagawa et al.

(10) Patent No.: US 6,865,143 B2
(45) Date of Patent: Mar. 8, 2005

(54) OPTICAL DEVICE INCLUDING A CALIBRATING UNIT FOR CALIBRATING A LEVEL ADJUSTING UNIT

(75) Inventors: Naoharu Yanagawa, Tokorozawa (JP); Masahiro Kato, Tokorozawa (JP); Tatsuhiro Yone, Tokorozawa (JP); Yuko Muramatsu, Tokorozawa (JP); Shinji Suzuki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 317 days.

(21) Appl. No.: 10/109,647

(22) Filed: Apr. 1, 2002

(65) Prior Publication Data

US 2002/0159344 A1 Oct. 31, 2002

(30) Foreign Application Priority Data

Apr. 2, 2001 (JP) .................................... 2001-103069

(51) Int. Cl.$^7$ ................................................ G11B 7/08
(52) U.S. Cl. ................................ 369/44.29; 369/44.16; 369/44.35
(58) Field of Search .......................... 369/44.29, 44.16, 369/44.35

(56) References Cited

U.S. PATENT DOCUMENTS

| 4,700,056 | A | | 10/1987 | Silvy et al. | |
|---|---|---|---|---|---|
| 5,026,981 | A | * | 6/1991 | Yamane et al. | 250/214 B |
| 5,233,444 | A | * | 8/1993 | Musha et al. | 359/15 |
| 5,721,723 | A | * | 2/1998 | Uchimaru et al. | 720/669 |
| 5,903,529 | A | * | 5/1999 | Nishi et al. | 369/44.23 |
| 6,101,156 | A | * | 8/2000 | Tanaka et al. | 369/44.28 |
| 6,621,771 | B1 | * | 9/2003 | Furuta et al. | 369/44.16 |

FOREIGN PATENT DOCUMENTS

| EP | 0 3732 974 | 6/1990 |
|---|---|---|
| EP | 0 478 367 A2 | 4/1992 |
| JP | 2-156424 | 6/1990 |
| JP | 10-105997 | 4/1998 |
| JP | 10-134376 | 5/1998 |

OTHER PUBLICATIONS

European Search Report.

* cited by examiner

*Primary Examiner*—Gautam R. Patel
(74) *Attorney, Agent, or Firm*—Finnegan, Henderson, Farabow, Garrett & Dunner, L.L.P.

(57) ABSTRACT

An optically recorded information recording and/or reading apparatus which eliminates the influence of stray light occurring within an optical system. In a state or a focus state which is forcedly set to position a reading point outside the outermost periphery of a disk surface, and the signal level is adjusted in a signal combiner circuit such that a light receiving level at that time matches a desired level.

2 Claims, 5 Drawing Sheets

OPTICAL DEVICE INCLUDING A CALIBRATING UNIT FOR CALIBRATING A LEVEL ADJUSTING UNIT

BACKGROUND OF THE INVENTION

1. Field of the Invention

The present invention relates to an optical device such as an optically recorded information recording/reading apparatus for reading an information signal recorded on an optical recording medium such as an optical disk.

2. Description of the Related Arts

An optically recorded information recording/reading apparatus includes an optical device which is typically referred to as an optical pickup and includes a light source such as a laser diode, so as to irradiate a recording surface of an optical recording medium with a laser beam from this light source. This optical device further captures a return beam of the laser beam reflected on the recording surface of the optical recording medium and receives the return beam on a plurality of light receiving surfaces to generate a plurality of light receiving signals. Then, these light receiving signals are combined to generate a read RF signal, a focus error signal, a tracking error signal, and the like.

In the optical system for use in the optically recorded information reading apparatus, it is known that slight reflection components remaining in respective optical parts prevent the level of the light receiving signal from reaching zero even though no recording medium is loaded and hence no return beam exists. Such remaining light is referred to as a stray light.

The existence of the stray light does not cause a grave problem in an optically recorded information reading apparatus dedicated to reproduction. However, for example, in such an optically recorded information reading apparatus that measures a pre-format characteristic of an optical disk such as a DVD-R, a DVD-RW and the like, an absolute value of a direct current level of a light receiving signal must be detected. It has been found that in such a case, the aforementioned stray light acts as a large impediment.

OBJECT AND SUMMARY OF THE INVENTION

It is therefore an object of the present invention to provide an optical device which comprises a function of removing the influence of the stray light as mentioned.

An optical device according to the present invention includes an optical system, a light receiver for receiving light from the optical system to generate light receiving signals, a level adjusting unit for adjusting signal levels of the light receiving signals, and controller for controlling the level adjusting unit, wherein the controller includes a calibrating unit for calibrating adjustment characteristics of the level adjusting unit in accordance with the magnitude of stray light occurring in the optical system.

DETAILED DESCRIPTION OF THE EMBODIMENT

In the following, an embodiment of the present invention will be described in detail with reference to the accompanying drawings.

Figure 1:
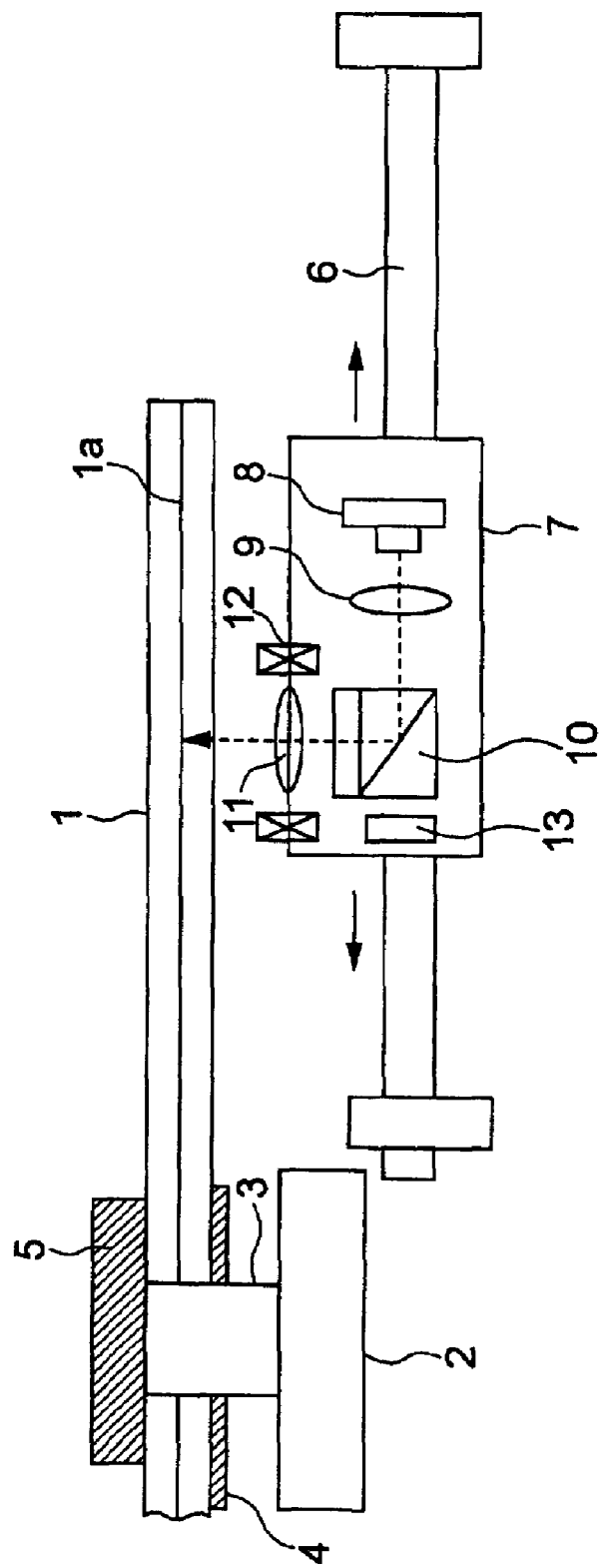
FIG. 1 is a partial cross-sectional view of an optical disk player including an optically recorded information reading apparatus according to the present invention.

FIG. 1 illustrates a portion of an optical disk player which includes an optically recorded information reading apparatus according to the present invention. Specifically, an optical disk 1 is securely fixed by a rear clamper 5 on the turn table 4 secured on a spindle shaft 3 which is driven by a spindle motor 2.

A guide rail 6 is disposed along a radial direction of the optical disk 1, and an optical pickup 7 is moved by a carriage, not shown, along the guide rail 6, and positioned at a desired position so that recorded information on the optical disk can be read at that position.

The optical pickup 7 includes, for example, a hologram laser unit 8, and a laser beam emitted from a laser diode (not shown) included in the hologram laser unit 8 is transformed into a parallel or collimated beam by a collimator lens 9. An example of the hologram laser unit is disclosed in Japanese Patent Kokai No. 11-39703. This parallel beam is reflected by a polarizing beam splitter 10 and bent in a direction perpendicular to a recording surface 1$a$ of the optical disk, converged through an objective lens 11, and irradiated to the recording surface of the optical disk 1 as an incident beam. The positioning of the objective lens 11 in the optical axis direction, i.e., focusing is performed by an actuator 12.

The actuator 12 is electromagnetically driven by a focus servo circuit, not shown. In addition, a front monitor 13 may be provided for measuring the magnitude of a leaking beam, which transmits a polarizing surface of the beam splitter 10, to monitor the intensity of the laser beam from the light source. The hologram laser unit 8 contains a photodiode (not shown) as a light receiver which detects the intensity of a return beam reflected from the recording surface 1$a$ of the optical disk 1.

Figure 2:
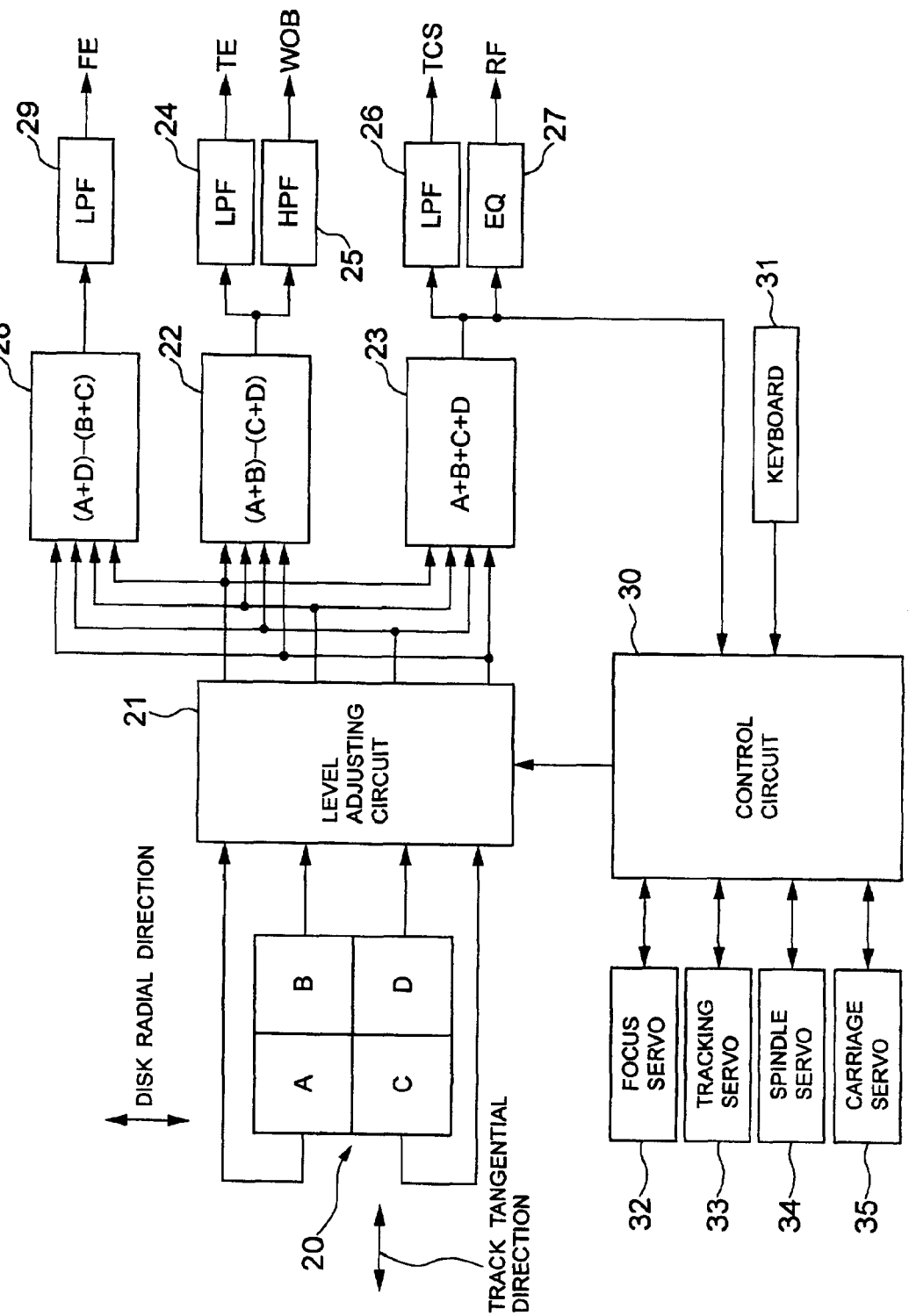
FIG. 2 is a block diagram illustrating the configuration of a signal system in the optically recorded information reading apparatus according to the present invention.

FIG. 2 illustrates the configuration of a signal processing circuit for processing a light receiving output of the aforementioned optical pickup 7, and a control circuit connected to the signal processing circuit for adjusting and controlling signal level adjustment characteristics of the light receiving output in the signal processing circuit as well as for controlling a carriage servo system for positioning the carriage and a focusing servo system for controlling the focusing of the objective lens 11.

Specifically, a light receiving surface 20 of the light receiver in the optical pickup 7 is comprised of a plurality of light receiving surfaces A, B, C, D, and light receiving signals from the respective light receiving surfaces A, B, C, D are supplied to a level adjusting circuit 21. The respective light receiving signal having the levels adjusted by the level adjusting circuit 21 are supplied to calculating circuits 22 and 23. The calculating circuit 22 generates a composite signal equal to (A+B)−(C+D), while the calculating circuit 23 generates a composite signal equal to (A+B+C+D). Also, a composite signal {(A+D)−(B+C)} from a calculating circuit 28 passes through a low pass filter 29, and serves as a focus error signal FE.

The composite signal from the calculating circuit 22 passes through a low pass filter 24 and serves as a tracking error signal TE, and also passes through a high pass filter 25 and serves as a wobble signal WOB. The composite signal from the calculating circuit 23 passes through a low pass filter 26 and serves as a track cross signal TCS, and also passes through an equalizer 27 and serves as a read reproduction signal RF.

The control circuit 30 comprised of a microcomputer and the like governs control operations of a variety of servo systems such as the focus servo system 32, tracking servo system 33, spindle servo system 34, carriage servo system 35 and the like for the optical disk player illustrated in FIG. 1 in response to an instruction input entered through an input device such as a keyboard 31 or the like. Since these servo systems and their control operations are well known technologies in the optical disk player, any detailed description thereon is not given here.

However, the optically recorded information reading apparatus according to the present invention executes a calibration routine, described below, upon power-on or at any other appropriate timings to adjust the level of the light receiving signal for removing a stray component included in the light receiving signal.

Figure 3:
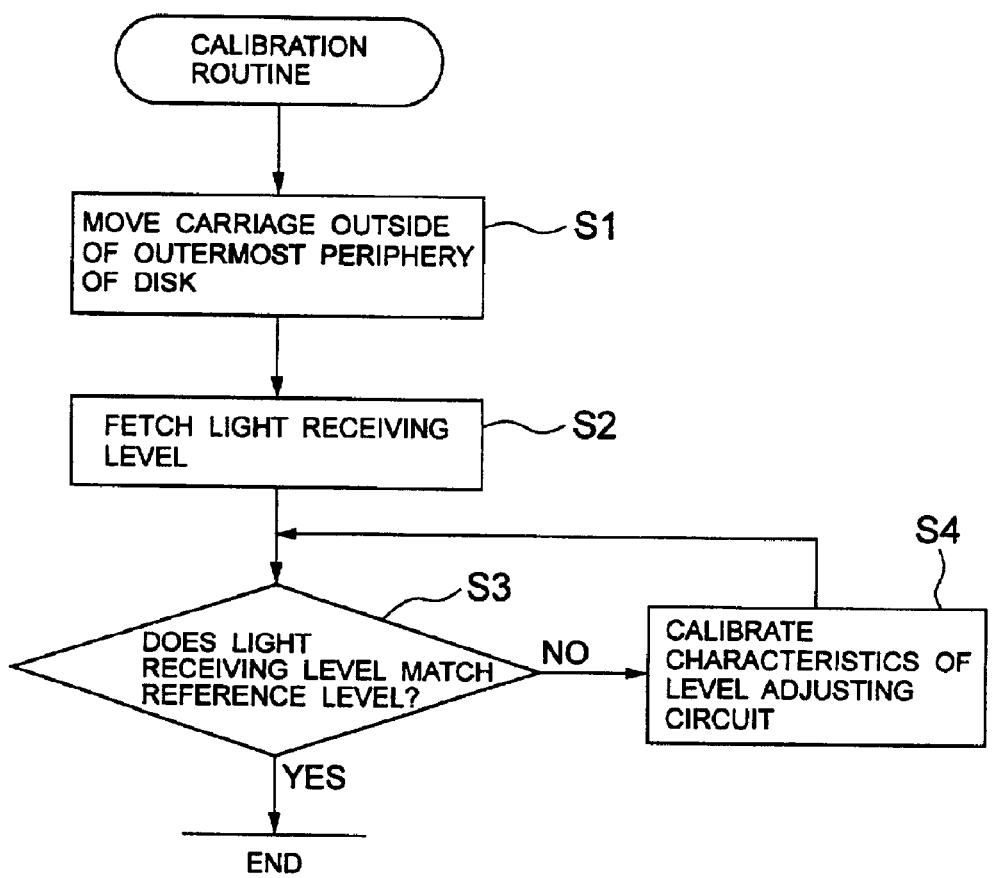
FIG. 3 is a flow chart illustrating an exemplary calibration routine according to the present invention.

FIG. 3 illustrates an example of the foregoing calibration routine.

For example, in the control circuit 30, this calibration routine is executed by interrupting a main routine, which is repeatedly executed in synchronism with a clock pulse, at proper timings.

First, in this calibration routine, the carriage servo system is driven to move the carriage to a position at which the reading beam from the objective lens 11 of the optical pickup 7 is projected outside beyond the outermost periphery of the optical disk 1 so that no return beam from the optical disk 1 return to the objective lens 11 (step S1). In this state, the signal level of the composite signal (A+B+C+D) at that time is fetched as a light receiving level (step S2). Then, the fetched light receiving level is compared with a reference level to determine whether the former matches the latter (step S3). If the light receiving level does not match the reference level, an instruction is given to the level adjusting circuit 21 to calibrate the level adjustment characteristics (step S4). When, consequently, it is determined that the light receiving level matches the reference level, this routine is terminated.

The timing at which the irradiation of the laser beam to the optical disk 1 is started may be either before step S1 or between step S1 and step S2.

Figure 4:
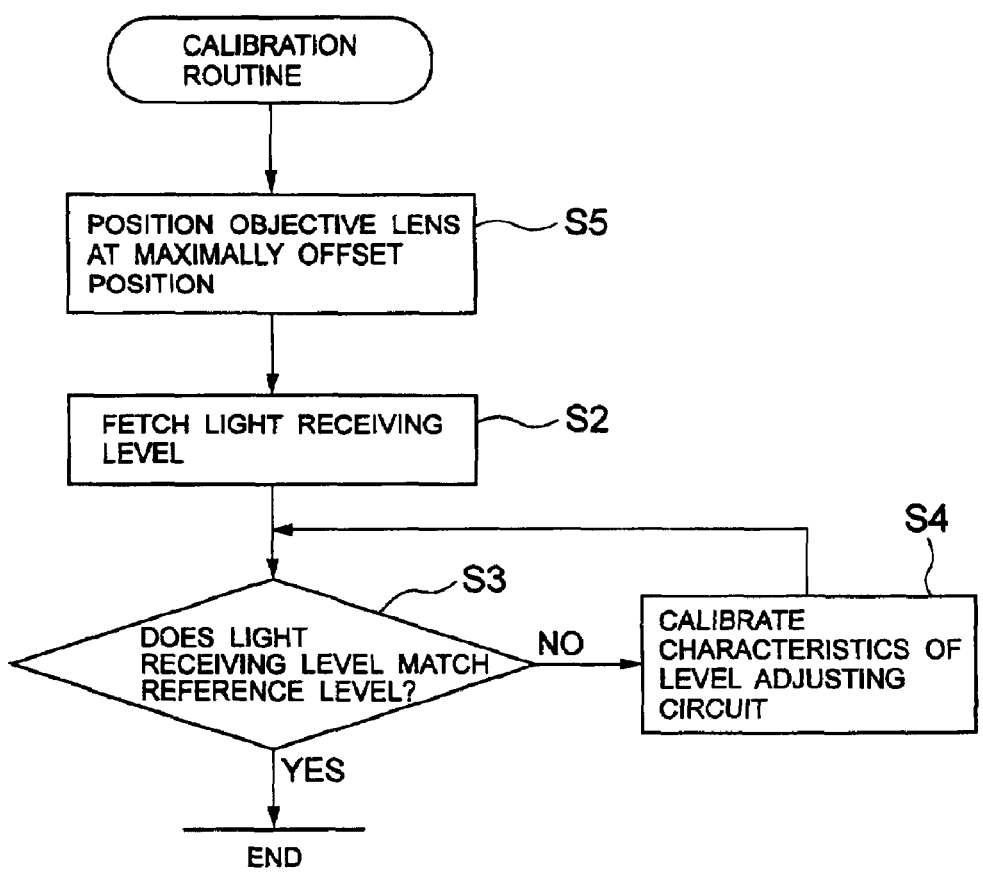
FIG. 4 is a flow chart illustrating another exemplary calibration routine according to the present invention.

FIG. 4 illustrates another example of calibration routine.

Figure 5A:
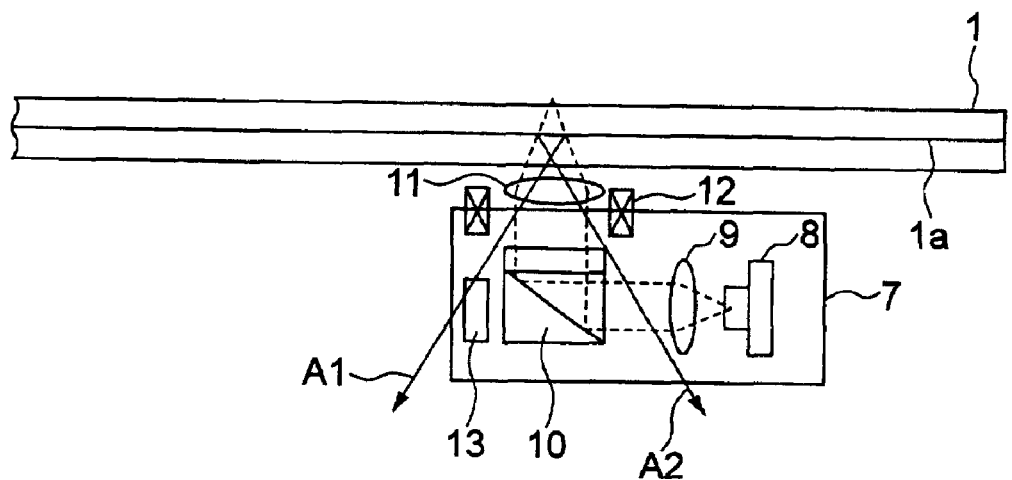
FIGS. 5A and 5B are cross-sectional views each showing the behavior of a light beam with respect to an optical disk when an objective lens is positioned at a maximally offset position in the optical disk player illustrated in FIG. 1.

In this calibration routine, first, the focusing servo system is controlled to position the objective lens at a maximally offset position (step S5). In this event, when the objective lens 11 is positioned at the maximally offset position nearest the optical disk 1 within its movable range, for example, as illustrated in FIG. 5A, the light beam is converged at a position downstream of a recording layer 1a, and a return beam diffuses in a range indicated by arrows A1 and A2, so that the return beam hardly returns to the light receiver in the hologram laser unit 8.

Figure 5B:
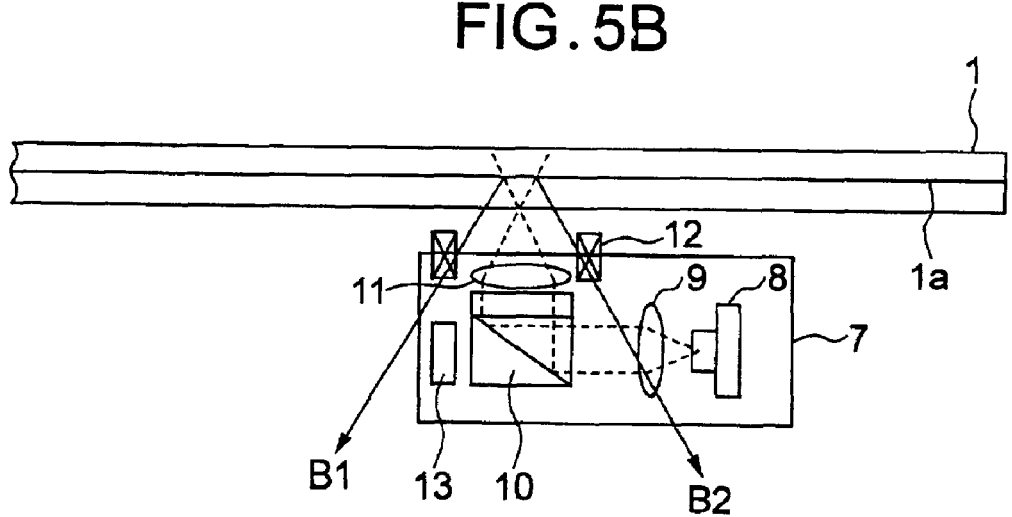

When, on the other hand, the objective lens 11 is positioned at a maximally offset position furthest away from the optical disk 1 within its movable range, as illustrated in FIG. 5B, the light beam 1 is converged at a position upstream of the recording layer 1a, so that a return beam diffuses within a range indicated by arrows B1 and B2, and therefore a light receiving output is hardly generated representing the intensity of the return beam.

Therefore, the light receiving output under the maximally offset state of the objective lens 11 depends only on the stray light. As such, a stray light level can be detected by executing steps S2 through S4 similar to the calibration routine illustrated in FIG. 3.

In the foregoing embodiment, the light receiving level is chosen to be the signal level of the composite signal (A+B+C+D). Alternatively, the light receiving level may be known by the signal level of at least one of the light receiving signals A, B, C, D before the combination. In this case, the level adjusting circuit 21 is adjusted for the level adjusting characteristic in accordance with the sensed light receiving level.

In addition, the focus error signal FE and tracking error signal TE can be calibrated in a similar manner.

The present invention can be applied not only when an optical disk is reproduced but also when an optical disk is recorded. For recording, the timing at which the irradiation of the laser beam to the optical disk 1 is started is after the optical disk is rotated. This is because if the laser beam is continuously irradiated to the same location on a recordable medium, the medium will be erroneously recorded.

While in the foregoing embodiment of the present invention, the magnitude of stray light occurring in the optical system is measured to adjust the signal level of the light receiving signal in accordance with the magnitude in an optical disk recording/reproducing apparatus which is taken as an example for purposes of explanation, the present invention is not limited to this, but may be applied to optical devices such as an imager, an optical scanner, an optical communication terminal device, and the like.

Since, as described above, the optical device according to the present invention performs the signal processing for eliminating the influence of stray light occurring in the optical system at a proper timing, an erroneous operation of the device due to the stray light can be avoided. As such, according to the optically recorded information recording/reading apparatus of the present invention, the operation for detecting a pre-format or the like can be correctly performed for a write-once disk and the like.

This application is based on a Japanese Patent Application No. 2001-103069 which is hereby incorporated by reference.

What is claimed is:

1. An optically recorded information recording and/or reading apparatus including a light source, an optical system for relaying a light beam from said light source, an objective lens for converging the light beam through said optical system on a recording surface, a light receiver for receiving a return beam from said recording surface through its light receiving surface to generate light receiving signals, a carriage for carrying the light source, optical system and objective lens, a carriage servo system for positioning said carriage in a direction parallel with said recording surface, a focus servo system for positioning said objective lens in a direction perpendicular to said recording surface, a level adjusting unit for adjusting signal levels of said light receiving signals, a signal combining unit for combining the light receiving signals after passing through said level adjusting unit to generate a composite signal, and controller for controlling said carriage servo system, said focus servo system and said level adjusting unit, respectively, wherein said controller includes a calibrating unit for calibrating adjustment characteristics of said level adjusting unit in accordance with a magnitude of a stray light and said calibrating unit controls said carriage servo system to move at least said objective lens to an outermost position at which said objective lens does not oppose said recording surface, and determines the magnitude of said stray light as a signal level of at least one of said light receiving signals or said composite signal at that instance.

2. An optically recorded information recording and/or reading apparatus including a light source, an optical system for relaying a light beam from said light source, an objective lens for converging the light beam through said optical system on a recording surface, a light receiver for receiving a return beam from said recording surface thorough its light receiving surface to generate light receiving signals, a carriage for carrying the light source, optical system and objective lens, a carriage servo system for positioning said carriage in a direction parallel with said recording surface, a focus servo system for positioning said objective lens in a direction perpendicular to said recording surface, a level adjusting unit for adjusting signal levels of aid light receiving signals, a signal combining unit for combining the light receiving signals after passing through said level adjusting unit to generate a composite signal, and controller for controlling said carriage servo system, said focus servo system and said level adjusting unit, respectively, wherein said controller includes a calibrating unit for calibrating adjustment characteristics of said level adjusting unit in accordance with a magnitude of a stray light and said calibrating unit controls said focus servo system to position said objective lens to a maximally offset position, and determines the magnitude of said stray light as a signal level of at least one of said light receiving signals or said composite signal at that instance.

* * * * *